United States Patent
Kashiwagi et al.

(10) Patent No.: US 10,982,631 B2
(45) Date of Patent: Apr. 20, 2021

(54) PULSATION DAMPER AND FUEL PUMP DEVICE

(71) Applicant: DENSO CORPORATION, Kariya (JP)

(72) Inventors: Daisuke Kashiwagi, Kariya (JP); Hiroyuki Shimai, Kariya (JP)

(73) Assignee: DENSO CORPORATION, Kariya (JP)

( * ) Notice: Subject to any disclaimer, the term of this patent is extended or adjusted under 35 U.S.C. 154(b) by 112 days.

(21) Appl. No.: 15/915,241

(22) Filed: Mar. 8, 2018

(65) Prior Publication Data

US 2018/0328322 A1    Nov. 15, 2018

(30) Foreign Application Priority Data

May 11, 2017    (JP) .............................. JP2017-95010

(51) Int. Cl.
*F02M 37/00* (2006.01)
*F04B 11/00* (2006.01)
*F16L 55/053* (2006.01)
*F16L 55/04* (2006.01)

(52) U.S. Cl.
CPC ..... *F02M 37/0041* (2013.01); *F04B 11/0016* (2013.01); *F16L 55/04* (2013.01); *F16L 55/053* (2013.01); *F16L 55/041* (2013.01)

(58) Field of Classification Search
CPC .. F02M 37/0041; F04B 11/00; F04B 11/0016; F16L 55/04; F16L 55/045; F16L 55/053; F16L 55/041
See application file for complete search history.

(56) References Cited

U.S. PATENT DOCUMENTS

| | | | |
|---|---|---|---|
| 7,124,738 B2 | 10/2006 | Usui et al. | |
| 2003/0164161 A1 | 9/2003 | Usui et al. | |
| 2007/0107698 A1 | 5/2007 | Usui et al. | |
| 2009/0185922 A1* | 7/2009 | Inoue | F02M 55/04 417/540 |
| 2012/0087817 A1 | 4/2012 | Lucas | |
| 2013/0052064 A1* | 2/2013 | Oikawa | F04B 11/0016 417/540 |
| 2013/0209289 A1* | 8/2013 | Lucas | F04B 11/0008 417/395 |
| 2016/0298581 A1* | 10/2016 | Nah | F02M 55/04 |

FOREIGN PATENT DOCUMENTS

| | | | | |
|---|---|---|---|---|
| JP | 2007309118 A | | 11/2007 | |
| JP | 2008-019728 A2 | * | 1/2008 | ............. F02M 55/00 |

* cited by examiner

*Primary Examiner* — Philip E Stimpert

(57) ABSTRACT

A pulsation damper includes: a case in which a fuel chamber is defined; and a damper unit arranged in the fuel chamber to attenuate pressure pulsation of fuel. The damper unit has a diaphragm that is elastically deformed by receiving pressure of fuel, and a plate having a rigidity higher than that of the diaphragm. A gas chamber is defined between the diaphragm and the plate joined with each other.

11 Claims, 7 Drawing Sheets

PULSATION DAMPER AND FUEL PUMP DEVICE

CROSS REFERENCE TO RELATED APPLICATION

This application is based on Japanese Patent Application No. 2017-95010 filed on May 11, 2017, the disclosure of which is incorporated herein by reference in its entirety.

TECHNICAL FIELD

The present disclosure relates to a pulsation damper and a fuel pump device.

BACKGROUND

JP 2013-60945A describes a pulsation damper which attenuates pressure pulsation of fuel generated in a fuel pump, so as to decrease noise, wearing or breakage in the piping components caused by the pressure pulsation. The pulsation damper has a case in which a fuel chamber is defined, and two diaphragms arranged in the fuel chamber. The two diaphragms are joined with each other to form a gas chamber inside, and are elastically deformed by receiving the pressure of fuel to attenuate the pressure pulsation.

SUMMARY

The attenuation performance to attenuate the pressure pulsation can be raised by enlarging the diaphragm. If the attenuation performance is too much, the size of the diaphragm is reduced. However, when the attenuation performance is controlled by adjusting the size and form of the diaphragm in this way, the efficiency of manufacturing the pulsation dampers is lowered, since it is necessary to prepare diaphragms different in size for changing the attenuation performance of the pulsation damper.

It is an object of the present disclosure to provide a pulsation damper and a fuel pump device in which attenuation performance can be minutely controlled.

According to an aspect of the present disclosure, a pulsation damper includes: a case in which a fuel chamber is defined; and a damper unit arranged in the fuel chamber to attenuate pressure pulsation of fuel. The damper unit has a diaphragm that is elastically deformed by receiving pressure of fuel, and a plate having a rigidity higher than that of the diaphragm. A gas chamber is defined between the diaphragm and the plate joined with each other.

According to an aspect of the present disclosure, a fuel pump device includes: a fuel pump which compresses and discharges fuel that flows in a fuel passage defined in a pump body; and a pulsation damper to reduce pressure pulsation of the fuel in the fuel passage. The pulsation damper includes a case in which a fuel chamber is defined, and a damper unit arranged in the fuel chamber to attenuate pressure pulsation of fuel. The damper unit has a diaphragm that is elastically deformed by receiving pressure of fuel, and a plate having a rigidity higher than that of the diaphragm. A gas chamber is defined between the diaphragm and the plate joined with each other.

Accordingly, the diaphragm is joined to the plate having high rigidity, in the damper unit, and the gas chamber is formed between the diaphragm and the plate. Therefore, one damper unit includes one diaphragm. The attenuation performance is controlled by controlling the number of the damper units. The number of the diaphragms can be increased or decreased as the same number of the damper units. Thus, the attenuation performance of the pulsation damper can be minutely controlled.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
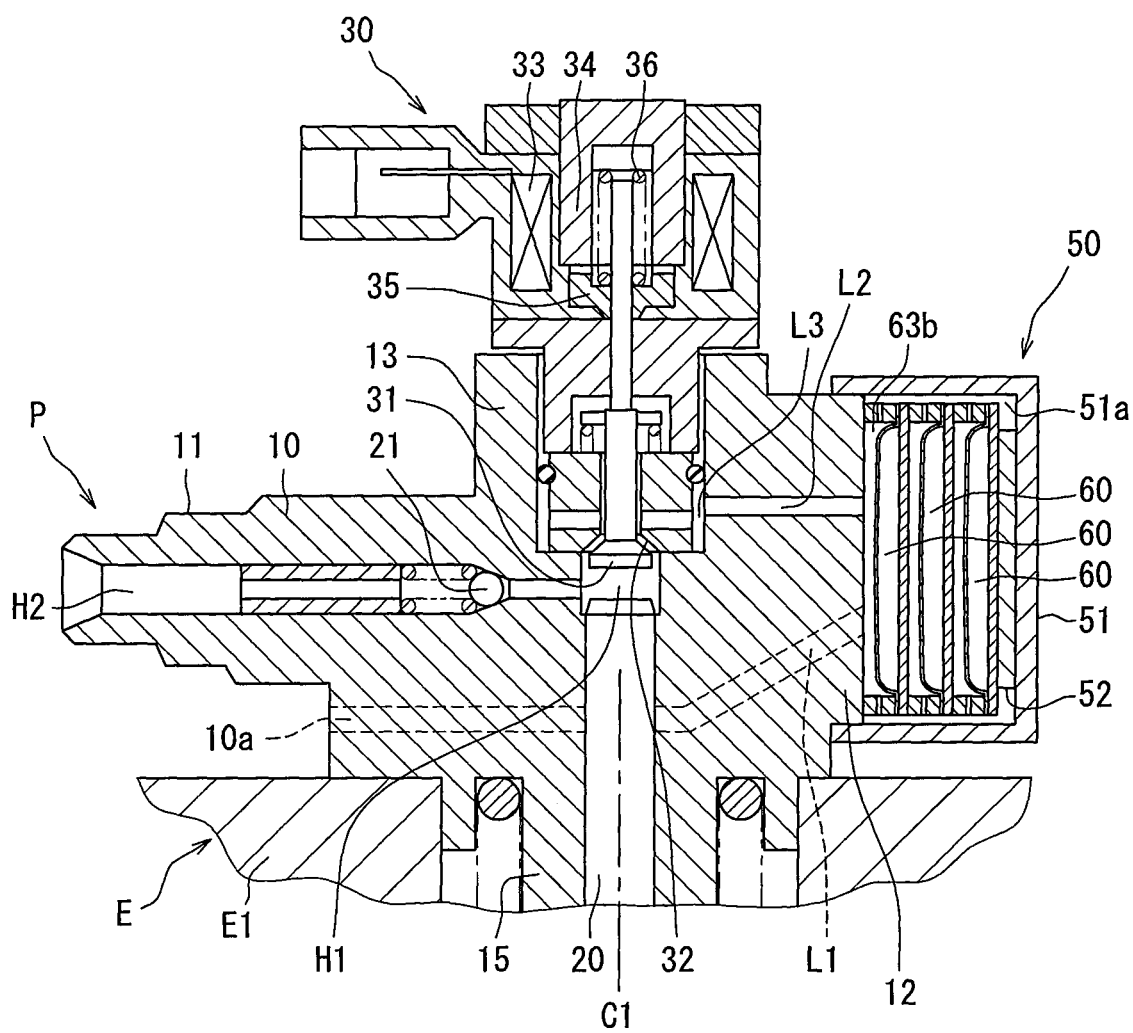
FIG. 1 is a sectional view illustrating a fuel pump device according to a first embodiment that is set to an engine.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A fuel pump device shown in FIG. 1 is applied to an internal-combustion engine (engine E) for a vehicle, and includes a fuel pump P and a pulsation damper 50. The fuel pump P compresses and discharges fuel for the engine E. The engine E is a compression self-ignition type, and the fuel compressed and discharged by the fuel pump device is light oil. The fuel pump P has a pump body 10, a piston 20, and a control valve unit 30. The pulsation damper 50 is attached to the pump body 10.

A fuel passage 10a is formed inside of the pump body 10. The fuel passage 10a includes a first low-pressure passage L1, a second low-pressure passage L2, a third low-pressure passage L3, a compression chamber H1, and a high-pressure passage H2. Fuel which flows into the fuel pump P from a fuel tank (not shown) flows through the first low-pressure passage L1, the second low-pressure passage L2, the pulsation damper 50, and the third low-pressure passage L3 in this order, and flows into the compression chamber H1 to be compressed by the piston 20. The high-pressure fuel compressed by the piston 20 is discharged out of the high-pressure passage H2, and is supplied to a common-rail (not shown). The high-pressure fuel supplied to the common-rail is injected from a fuel injection valve to the combustion chamber of the engine E.

The pump body 10 is made of metal and formed by, for example, punching holes in a forged product. The pump body 10 has a high-pressure port 11, a damper attachment 12, a control valve attachment 13, and a cylinder 15. The high-pressure passage H2 is defined in the high-pressure port 11, and a high-pressure piping (not shown) is connected to the high-pressure port 11. A pressure valve 21 is attached in the high-pressure passage H2. When a pressure of fuel pressurized in the compression chamber H1 becomes more than or equal to a predetermined pressure, the pressure valve 21 opens and high-pressure fuel is discharged from the high-pressure port 11. The high-pressure port 11 is formed to extend in a direction perpendicular to the axial direction of the piston 20. The axial direction represents a both-way reciprocating direction of the piston 20, that is along the axis C1 of the piston 20.

The control valve attachment 13 is projected in the axial direction of the piston 20. An attachment hole 13a is formed inside of the control valve attachment 13, and the control valve unit 30 is attached into the attachment hole 13a.

The control valve unit 30 has a control valve 31, an electromagnetic coil 33, a fixed core 34, a movable core 35, and a spring 36. The control valve 31 controls the quantity of fuel to be compressed by opening and closing an inflow port 32 of the compression chamber H1. The control valve 31 is attached to the control valve unit 30 in the state where the control valve 31 is able to move in both-way. The control valve unit 30 is attached to the control valve attachment 13 in a manner that the reciprocation direction of the control valve 31, that is, the axis of the control valve 31 agrees with the axis C1 of the piston 20.

When the electromagnetic coil 33 is energized, magnetic flux arises to the fixed core 34 and the movable core 35. The fixed core 34 and the movable core 35 form a magnetic circuit, and the movable core 35 is attracted to the fixed core 34 by the magnetic force. The movable core 35 attracted in this way moves with the control valve 31, and the spring 36 biases the movable core 35 and the control valve 31 in a direction different from the magnetic force. Therefore, when the electromagnetic coil 33 is energized, the movable core 35 and the control valve 31 move to one side by the magnetic force against the elastic force. When the energizing of the electromagnetic coil 33 is stopped, the movable core 35 and the control valve 31 move to the other side due to the elastic force. Specifically, the control valve 31 is a normally-open type valve which is closed by the energizing. The control valve 31 is opened by stopping the energizing. The energizing to the electromagnetic coil 33 is controlled by a control device (not shown).

The fuel pump device is assembled to a predetermined part of the engine E. For example, the fuel pump device is attached to a crankcase E1 that houses and supports a crankshaft of the engine E. In this state, the driving force of the engine E is transmitted to the piston 20 through a cam (not shown), and the piston 20 reciprocates inside of the cylinder 15 while the engine E is operated.

The damper attachment 12 is projected in the direction perpendicular to the axial direction of the piston 20. The end of the first low-pressure passage L1 and the end of the second low-pressure passage L2 are open in the projection end surface of the damper attachment 12.

The pulsation damper 50 has a case 51, an elastic support object 52, and plural damper units 60. The case 51 is made of metal to have a based cylinder shape, and is attached to the damper attachment 12 to form a fuel chamber 51a inside. The case 51 is attached to the damper attachment 12 by welding or screwing. The fuel chamber 51a is filled with the low-pressure fuel which flows from the first low-pressure passage L1 and the second low-pressure passage L2.

The elastic support object 52 and the damper units 60 are arranged in the predetermined direction (the left and right direction of FIG. 2) in the fuel chamber 51a. The elastic support object 52 is made of metal or rubber, and is fixed to the bottom surface of the case 51. The damper units 60 are inserted and supported between the elastic support object 52 and the damper attachment 12. In this embodiment, the damper units 60 are supported between the elastic support object 52 and the damper attachment 12 without being fixed with each other. The damper units 60 may be fixed with each other by welding.

Figure 2:
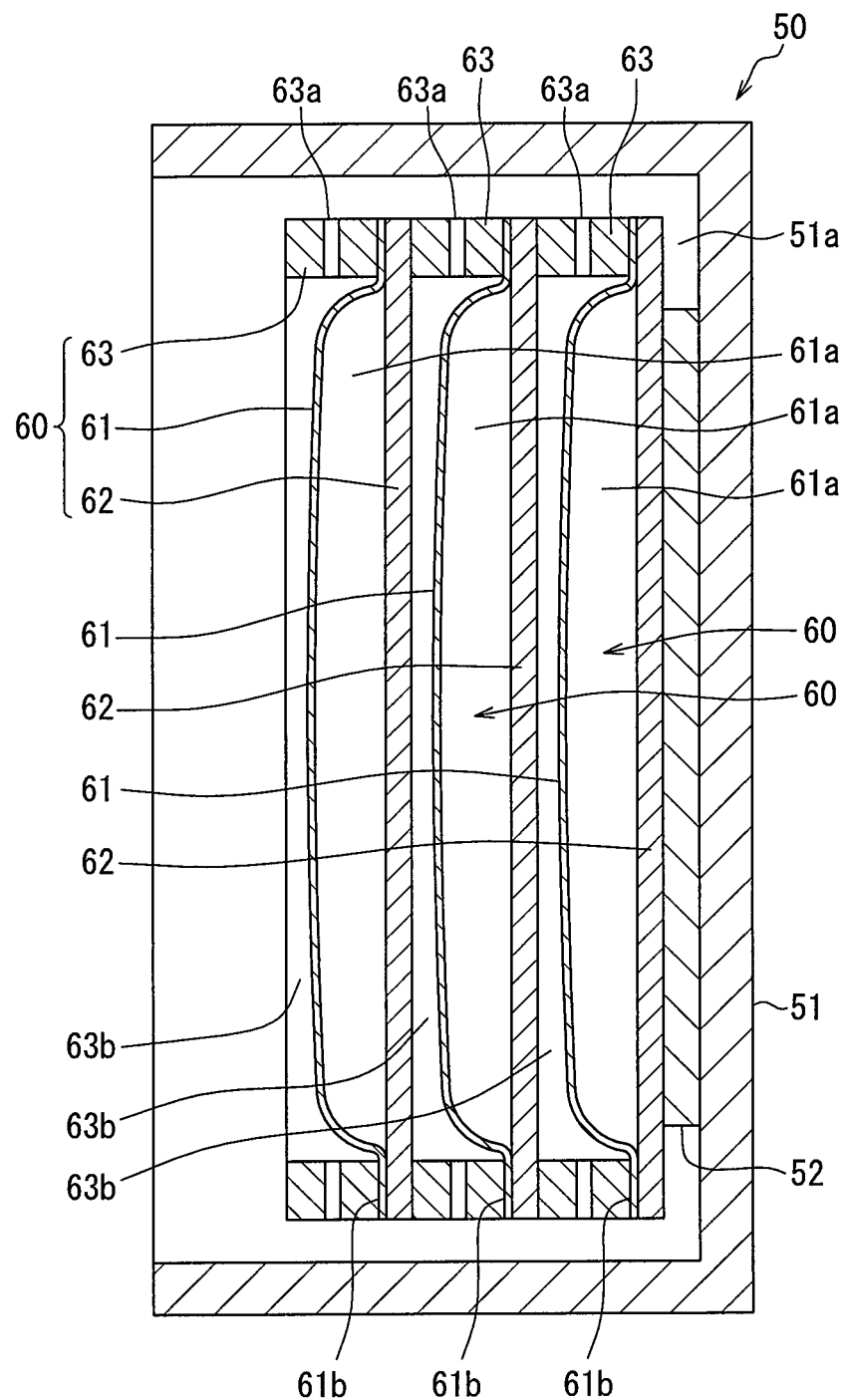
FIG. 2 is a sectional view illustrating a pulsation damper in FIG. 1.

As shown in FIG. 2, each of the damper units 60 has a diaphragm 61, a plate 62, and a spacer 63. The configuration and the form are the same among the damper units 60.

The diaphragm 61 has a cup form manufactured by press molding a filmy metal plate, and is elastically deformed by receiving the pressure of fuel which flows into the fuel chamber 51a. The plate 62 is a metal board, and is joined to the diaphragm 61 so that a gas chamber 61a is formed between the diaphragm 61 and the plate 62. The gas chamber 61a is filled with high-pressure gas having pressure higher than atmospheric pressure. More concretely, the diaphragm 61 and the plate 62 have round shape when seen from a direction perpendicular to the board surface of the plate 62. The diaphragm 61 shaped in the cup has an opening, and the opening is covered and closed by the plate 62. The outer peripheral edge (flange part) of the diaphragm 61 is welded to the plate 62, and the interior space defined by the diaphragm 61 and the plate 62 corresponds to the gas chamber 61a.

The plate 62 has a rigidity higher than a rigidity of the diaphragm 61. Specifically, the thickness of the plate 62 is larger than the thickness of the diaphragm 61. The flexural rigidity of the plate 62 is higher than the flexural rigidity of the diaphragm 61.

The spacer 63 is a metal cylinder, and one end surface of the spacer 63 is joined to the flange part of the diaphragm 61. Thus, the diaphragm 61, the plate 62, and the spacer 63 are welded with each other, to integrally form the damper unit 60. The other end surface of the spacer 63 is in contact with the adjacent plate 62 of the adjacent damper unit 60, such that a distance of a space is specified between the diaphragms 61 adjacent to each other in the predetermined direction. The inner circumference surface of the spacer 63 opposes the diaphragm 61.

Of the plural damper units 60, the damper unit 60 which opposes the damper attachment 12 (upstream side damper unit) forms a damper chamber 63b surrounded by the end surface of the damper attachment 12, the inner circumference surface of the spacer 63, and the diaphragm 61 (refer to FIG. 1). The spacer 63 has plural penetration holes 63a passing through in the radial direction and arranged in the circumferential direction. Therefore, the fuel in the fuel chamber 51a flows in or out of the damper chamber 63b through the penetration hole 63a. Of the plural damper units 60, the other damper units 60 other than the upstream side damper unit form the damper chamber 63b surrounded by the plate 62 of the adjacent damper unit 60, the inner circumference surface of the spacer 63 and the diaphragm 61.

The spacer 63 of the upstream side damper unit defines a distance of a space between the damper attachment 12 and the diaphragm 61. In this case, an opposite component which opposes the upstream side damper unit corresponds to the damper attachment 12 of the pump body 10. The spacer 63 of the other damper units defines a distance of a space between the plate 62 of the adjacent damper unit 60 and the diaphragm 61. In this case, an opposite component which opposes the other damper unit corresponds to the plate 62 of the adjacent damper unit 60.

The pressure of fuel in the damper chamber 63b is rippled. Specifically, the fuel pressure changes with a predetermined cycle. In a pressure waveform that represents a change in pressure relative to a lapsed time, waveforms of plural frequency components overlap with each other. The diaphragm 61 is elastically deformed in the predetermined direction according to such pulsation in fuel pressure, and the pulsation of fuel pressure is absorbed and reduced by the diaphragm 61. The elastic deformation of the plate 62 is small to such an extent that can be ignored, compared with the elastic deformation of the diaphragm 61, and does not contribute to the reduction in the fuel pressure pulsation.

Next, the operation of the fuel pump P is explained.

A control device (not shown) controls the electric power supply to the electromagnetic coil 33, and opens the control valve 31 in the period in which the piston 20 descends. Thereby, the low-pressure fuel flowing through the first low-pressure passage L1, the fuel chamber 51a including the damper chamber 63b, the second low-pressure passage L2, and the third low-pressure passage L3 in this order is drawn into the compression chamber H1 through the inflow port 32.

Then, the control device opens the control valve 31 until a desired control period passes after the piston 20 starts rising. Thereby, in the control period in which the flow rate is controlled, the low-pressure fuel of the compression chamber H1 flows out of the inflow port 32, and is put back toward the third low-pressure passage L3, the second low-pressure passage L2, the fuel chamber 51a, and the first low-pressure passage L1. Thus, the pressure of the fuel flowing backward in this way is rippled. This pressure pulsation spreads in order of the fuel of the third low-pressure passage L3, the fuel of the second low-pressure passage L2, and the fuel of the fuel chamber 51a. The pulsation in the fuel pressure spreads to the fuel of the fuel chamber 51a is absorbed and reduced by the diaphragm 61. Thereby, noise or breakage and wearing in the piping parts, which are caused by the fuel pressure pulsation, can be reduced.

Then, the control device closes the control valve 31 in the rising phase (compression period) of the piston 20 after the control period passed. Thereby, in the compression period, the fuel of the compression chamber H1 is pressurized, and the pressure becomes high. When the pressure becomes more than or equal to a predetermined pressure, the pressure valve 21 is opened and the high-pressure fuel is breathed out from the high-pressure passage H2. Therefore, the control period is controlled by controlling the valve closing timing of the control valve 31, such that the quantity of the fuel compressed in the compression period is controlled.

As explained above, the pulsation damper 50 of this embodiment includes the damper unit 60 arranged in the fuel chamber 51a of the case 51 to attenuate pressure pulsation of fuel. The damper unit 60 has the diaphragm 61 and the plate 62. The plate 62 shaped in a board has a rigidity higher than that of the diaphragm 61, and the gas chamber 61a is defined between the diaphragm 61 and the plate 62 joined with each other.

Accordingly, the attenuation performance of the pulsation damper 50 can be adjusted, without changing the size and the form of the diaphragm 61, by adjusting the number of the damper units 60 arranged in the fuel chamber 51a. Since one diaphragm 61 is include in one damper unit 60, the number of the diaphragms 61 is increased or decreased as the same number of the damper units 60 that is increased or decreased, when changing the number of the damper units 60 to control the attenuation performance. Therefore, according to this embodiment, the attenuation performance of the pulsation damper 50 can be adjusted minutely, compared with a case where two diaphragms 61 are included in one damper unit 60.

In a comparative example, one damper unit includes two diaphragms, and the plural damper units are disposed in one fuel chamber. Since the attenuation performance can be adjusted by adjusting the number of damper units, it is unnecessary to prepare diaphragms different in size, and the efficiency of manufacturing the pulsation damper can be improved.

However, since the two diaphragms are included in one damper unit in the comparative example, the number of diaphragms is increased or decreased by twice of the number of damper units. Therefore, it is difficult to finely adjust the attenuation performance, since the resolution of adjustment is low. Moreover, it may be difficult to position the damper units depending the arrangement of the diaphragms, in consideration of the elastically deforming directions.

Furthermore, according to this embodiment, the spacer 63 specifies the distance of a space between the opposite component and the diaphragm 61 in the predetermined direction. The spacer 63 is fixed integrally with the damper unit 60. Therefore, it is unnecessary to insert the spacer 63 and the damper unit 60 into the case 51 separately when assembling the pulsation damper 50.

Furthermore, in this embodiment, the plural damper units 60 are arranged in the predetermined direction, inside the fuel chamber 51a. The damper units 60 are the same in the configuration and the form. Therefore, the efficiency of manufacturing the pulsation dampers 50 can be improved since it is unnecessary to prepare the damper units 60 different in the shape.

Furthermore, according to this embodiment, the pulsation damper 50 is disposed relative to the fuel pump device, such that the predetermined direction in which the diaphragm 61 is elastically deformed crosses the axis C1 of the piston 20. Therefore, the control valve 31 can be arranged on the axis C1 of the piston 20, such that the volume of the high-pressure fuel which remains after fuel discharge can be decreased, compared with a case where the control valve 31 is arranged to cross the axis C1. In recent years, there is a tendency that the pressure is raised in the fuel pump P. As the pressure in the compression chamber H1 is higher, it is required to reduce the loss by decreasing the volume. Therefore, according to this embodiment, in which the control valve 31 is arranged on the axis C1 of the piston 20, the volume can be decreased to reduce the loss.

Furthermore, in this embodiment, the plate 62 with high rigidity has a function to be attached with the adjacent damper unit 60, when placing the plural damper units 60. Specifically, the plate 62 is assembled to the damper unit 60 by being joined to the spacer 63. Therefore, the damper units 60 can be installed without a component, for exclusive use, having the attachment function, such that the installation can be made easy. Moreover, the plate 62 with high rigidity also has a function of forming the fuel chamber 51a, the size of the pulsation damper 50 can be restricted from becoming large.

Second Embodiment

The plate 62 of the first embodiment has a flat board shape which does not have protrusion nor recess. In a second embodiment, the plate 620 of the damper unit 600 has a protrusion part (enlarging protrusion part 620a) projected to enlarge the gas chamber 61a (refer to FIG. 3). Specifically, the plate 620 having the enlarging protrusion part 620a is fabricated by press processing a metal plate having a uniform thickness. The volume of the gas chamber 61a is increased by a volume surrounded by the inner wall surface 620b of the enlarging protrusion part 620a.

The enlarging protrusion part 620a has a ring shape surrounding the central line C2 of the plate 620, when seen from a direction perpendicular to the board surface of the plate 620. Therefore, a portion of the gas chamber 61a by which the volume is increased is annularly extended to surround the central line C2 of the plate 620.

Figure 3:
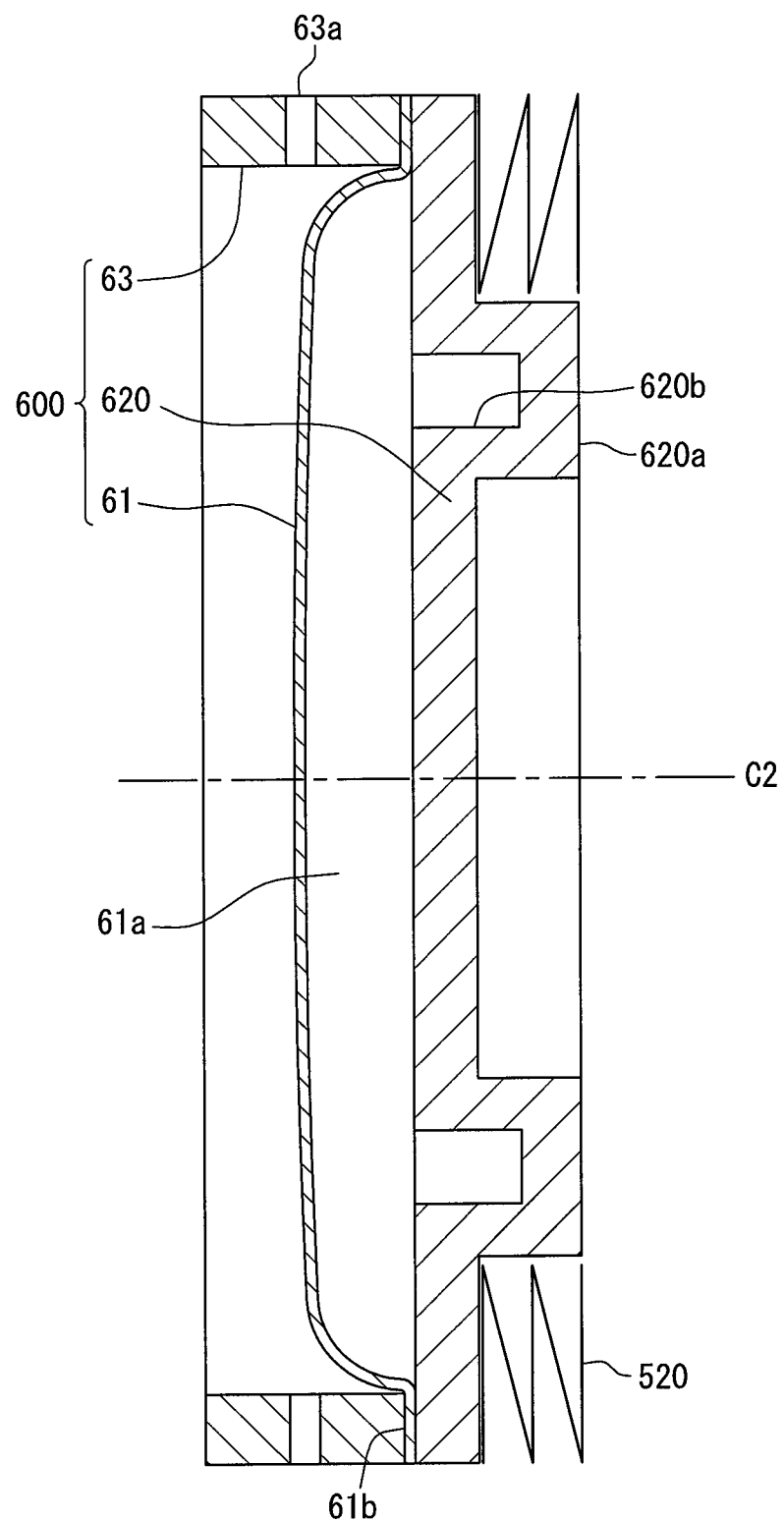
FIG. 3 is a sectional view illustrating a damper unit and an elastic support object according to a second embodiment.

In FIG. 3, illustration of the case 51 is omitted. The pulsation damper of this embodiment has the damper unit 600 and the elastic support object 520, instead of the damper unit 60 and the elastic support object 52 of the first embodiment.

The elastic support object 52 of the first embodiment is arranged to overlap with a center area of the plate 62. In contrast, the elastic support object 520 of this embodiment is arranged in an area outside of the enlarging protrusion part 620a in the radial direction, i.e., except the central line C2 of the plate 620. Furthermore, the elastic support object 520 of this embodiment is a coil spring. The elastic support object 520 may be a spring washer, or an annular sheet made of rubber.

According to the present embodiment, the plate 620 of the pulsation damper has the enlarging protrusion part 620a projected to enlarge the gas chamber 61a. Therefore, the volume of the gas chamber 61a is adjusted by adjusting the form and the size of the enlarging protrusion part 620a, such that the attenuation performance of the pulsation damper can be adjusted. Thus, the attenuation performance of the pulsation damper can be adjusted, without changing the size and form of the diaphragm 61. For example, the volume of the gas chamber 61a can be increased by enlarging the enlarging protrusion part 620a. As a result, when receiving a pulsation pressure, the increase ratio of the internal gas pressure can be reduced by the increase in the volume. Thus, the deformation amount of the diaphragm 61 is increased to improve the attenuation performance. However, a strength required for the diaphragm 61 relative to cyclic stress becomes large as the trade-off.

Moreover, the attenuation performance can be made different between the damper unit 600 including the plate 620 with the enlarging protrusion part 620a, and a damper unit using the plate 62 which does not have the enlarging protrusion part 620a. Therefore, the attenuation performance of the pulsation damper can be adjusted without changing the size and form of the diaphragm 61 of the damper unit.

Furthermore, since the enlarging protrusion part 620a of this embodiment is formed to have the ring shape surrounding the central line C2 of the plate 620, the enlarging protrusion part 620a functions as a rib raising the rigidity of the plate 620 relative to a bending deformation. Therefore, the variation in the attenuation performance which is caused by the bending deformation of the plate 620 can be reduced.

Third Embodiment

Figure 4:
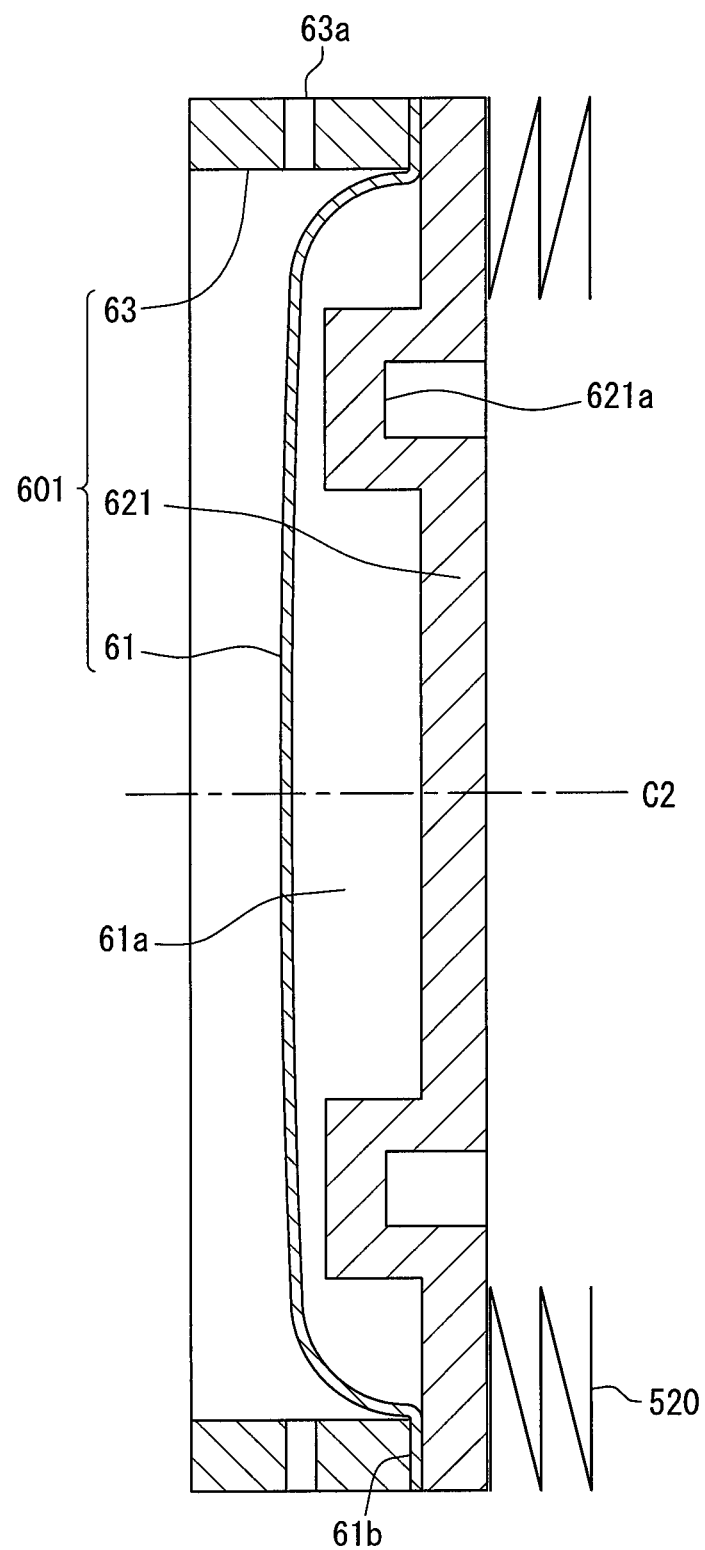
FIG. 4 is a sectional view illustrating a damper unit and an elastic support object according to a third embodiment.

The plate 620 of the second embodiment has the enlarging protrusion part 620a projected to enlarge the gas chamber 61a. In contrast, the plate 621 of the damper unit 601 of this embodiment has a protrusion part (reduction protrusion part 621a) projected to reduce the size of the gas chamber 61a (refer to FIG. 4). Specifically, the plate 621 having the reduction protrusion part 621a is fabricated by press processing a metal plate having a uniform board thickness. The volume of the gas chamber 61a is reduced by the reduction in the volume of the reduction protrusion part 621a.

The reduction protrusion part 621a is formed to have the ring shape surrounding the central line C2 of the plate 621 when seen from a perpendicular direction perpendicular to the board surface of the plate 621. Therefore, a portion of the gas chamber 61a where the volume is reduced has the form annularly extended to surround the central line C2 of the plate 621.

The plate 621 of the pulsation damper of this embodiment has the reduction protrusion part 621a projected to reduce the size of the gas chamber 61a. Therefore, the capacity of the gas chamber 61a is adjusted by adjusting the form and the size of the reduction protrusion part 621a, such that the attenuation performance of a pulsation damper can be adjusted. Thus, the attenuation performance of a pulsation damper can be adjusted, without changing the size and form of the diaphragm 61. For example, the volume of the gas chamber 61a is reduced by enlarging the reduction protrusion part 621a. As a result, the deformation amount of the diaphragm 61 is reduced by the reduction in the volume, such that the attenuation performance is lowered. However, a strength required for the diaphragm 61 relative to cyclic stress can be reduced.

Moreover, the attenuation performance can be made different between the damper unit 601 having the plate 621 with the reduction protrusion part 621a and a damper unit using the plate 62 which does not have the reduction protrusion part 621a. Therefore, the attenuation performance of a pulsation damper can be adjusted without changing the size and form of the diaphragm 61 of the damper unit.

Furthermore, since the reduction protrusion part 621a of this embodiment is formed to have the ring shape surrounding the central line C2 of the plate 621, the reduction protrusion part 621a functions as a rib raising the rigidity of the plate 621 relative to a bending deformation. Therefore, the variation in the attenuation performance caused by the bending deformation of the plate 621 can be reduced.

Fourth Embodiment

Figure 5:
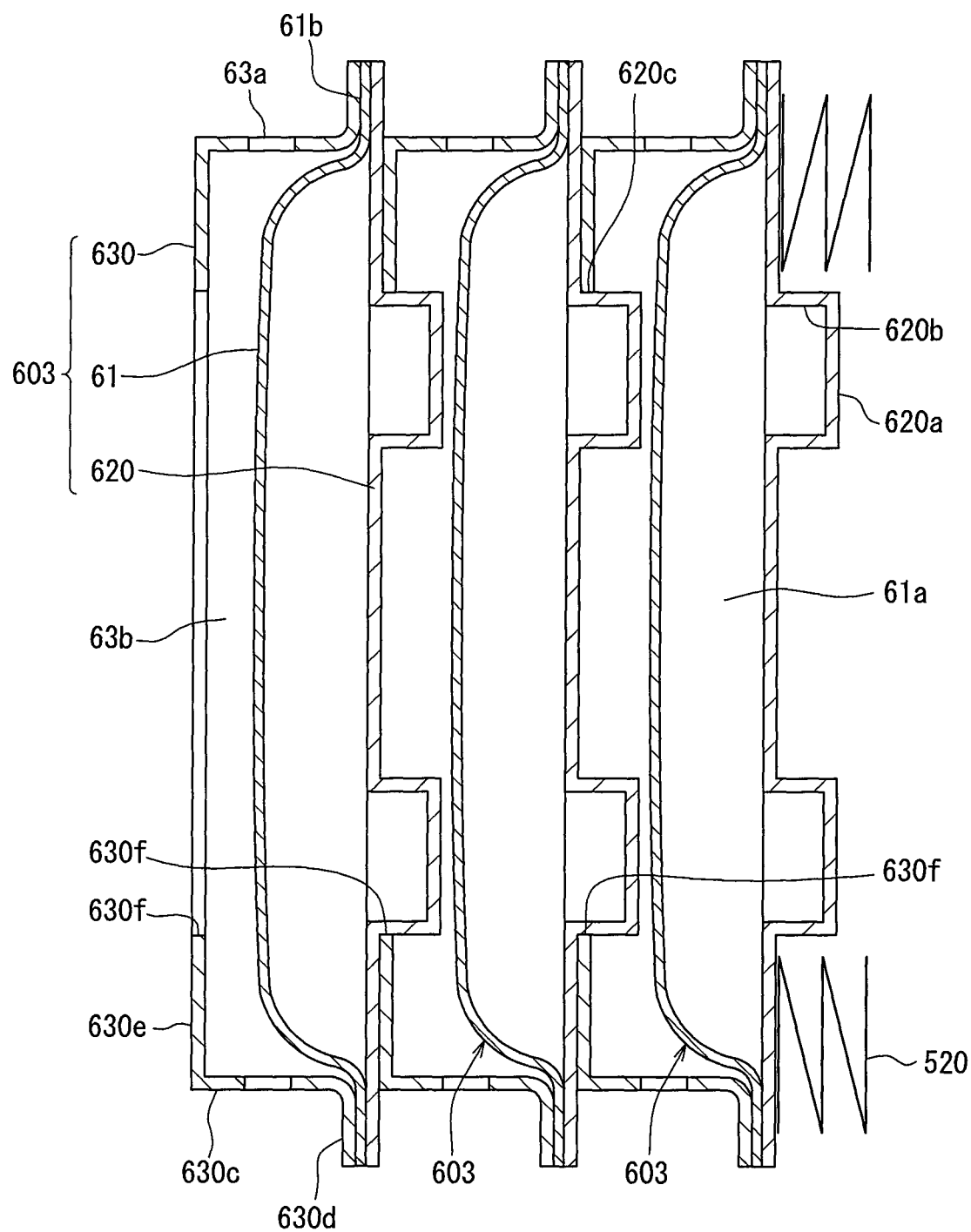
FIG. 5 is a sectional view illustrating damper units and an elastic support object according to a fourth embodiment.

The pulsation damper of this embodiment has a spacer 630 shown in FIG. 5, instead of the spacer 63 shown in FIG. 3. The spacer 630 is formed to have a cylinder part 630c, a flange part 630d, and a regulation part 630e by press processing a metal plate having a uniform board thickness.

The cylinder part 630c has a cylinder shape extending in the predetermined direction, and a distance of a space between the diaphragms 61 adjacent to each other in the predetermined direction is specified by the length of the cylinder part 630c in the axial direction. The flange part 630d has a ring form projecting in the radial direction outward from the end of the cylinder part 630c, and is joined to the flange portion 61b of the diaphragm 61 or the plate 620. The regulation part 630e has a ring form extending inward in the radial direction from the other end of the cylinder part 630c, and is in contact with a portion of the plate 620 of the adjacent damper unit 603 located on the outer circumference side of the enlarging protrusion part 620a. A penetration hole 630f is formed in the central portion of the regulation part 630e, and the enlarging protrusion part 620a of the adjacent damper unit 603 is inserted into the penetration hole 630f. Thus, the enlarging protrusion part 620a is inserted and fitted with the penetration hole 630*f*, such that the outer circumference side of the enlarging protrusion part 620*a* and the inner circumference side of the regulation part 630*e* are in contact with each other. Thereby, the regulation part 630*e* regulates the adjacent damper unit 603 from moving relative to each other in the radial direction perpendicular to the predetermined direction.

Among the plural damper units 603, the damper unit 603 adjacent to the elastic support object 520 is in contact with the elastic support object 520, around the surface located on the radially outer side of the enlarging protrusion part 620*a*. Since the elastic support object 520 is fixed to the case 51, the damper unit 603 is regulated from moving in the radial direction relative to the case 51. The plural damper units 603 are forced onto in the predetermined direction by the elastic force of the elastic support object 520, and are supported between the damper attachment 12 and the case 51.

According to the present embodiment, the distance of a space between the diaphragms 61 adjacent to each other in the predetermined direction is defined by the spacer 630. The spacer 630 has the regulation part 630*e* which regulates the damper unit 603 from moving in the direction perpendicular to the predetermined direction by being in contact with the enlarging protrusion part 620*a*. Therefore, the damper unit 603 can be positioned in the radial direction using the enlarging protrusion part 620*a* of the plate 620.

Fifth Embodiment

The enlarging protrusion part 620*a* is inserted in the penetration hole 630*f* of the spacer 630, such that the spacer 630 and the enlarging protrusion part 620*a* are in contact with each other in the fourth embodiment. In a fifth embodiment, the pulsation damper has the spacer 631 and the plate 622 shown in FIG. 6, instead of the spacer 630 and the plate 620 shown in FIG. 5.

The spacer 631 is formed to have a cylinder part 631*c*, a flange part 631*d*, and a regulation part 631*e* by press processing a metal plate having a uniform board thickness. The cylinder part 631*c* has a cylinder shape extending in the predetermined direction, and a distance of a space between the adjacent diaphragms 61 in the predetermined direction is specified by the length of the cylinder part 631*c* in the axial direction. The flange part 631*d* has a ring form projected in the radial direction outward from the end of the cylinder part 631*c*, and is joined to the flange portion 61*b* of the diaphragm 61 or the plate 622.

The regulation part 631*e* has a ring form projected inward in the radial direction from the other end of the cylinder part 631*c*, and is in contact with a portion of the plate 622 of the adjacent damper unit 604 located on the radially outer side of the enlarging protrusion part 622*a*.

The enlarging protrusion part 622*a* of the adjacent damper unit 604 is inserted in a concave portion 631*g*. Thus, an outer periphery surface (contact side 622*t*) of the enlarging protrusion part 622*a* and a peripheral wall surface (contact side 631*t*) of the concave portion 631*g* are in contact with each other by inserting the enlarging protrusion part 622*a* into the concave portion 631*g*. The contact sides 622*t* and 631*t* have a taper shape inclined in the same direction to the predetermined direction, and are shaped to annularly extend about the central line C2 of the spacer 631 and the plate 622. Thus, the contact side 622*t* of the plate 622 and the contact side 631*t* of the spacer 631 are in contact with each other, such that the adjacent damper unit 604 is regulated by the regulation part 631*e* from being displaced relative to each other in the radial direction perpendicular to the predetermined direction.

Of the plural damper units 604, the damper unit 604 adjacent to the elastic support object 520 has the enlarging protrusion part 622*a*, and the contact side 622*t* of the enlarging protrusion part 622*a* is in contact with the elastic support object 520. Since the elastic support object 520 is fixed to the case 51, the damper unit 604 is regulated from moving in the radial direction relative to the case 51. The plural damper units 604 are forced onto in the predetermined direction by the elastic force of the elastic support object 520, and supported between the damper attachment 12 and the case 51.

According to this embodiment, a distance of a space between the adjacent diaphragms 61 in the predetermined direction is defined by the spacer 631. The spacer 631 has the regulation part 631*e* which is in contact with the enlarging protrusion part 622*a*, to restrict the damper unit 604 from moving in the direction perpendicular to the predetermined direction. Therefore, the positioning of the damper unit 604 can be determined in the radial direction using the enlarging protrusion part 622*a* of the plate 622.

Figure 6:
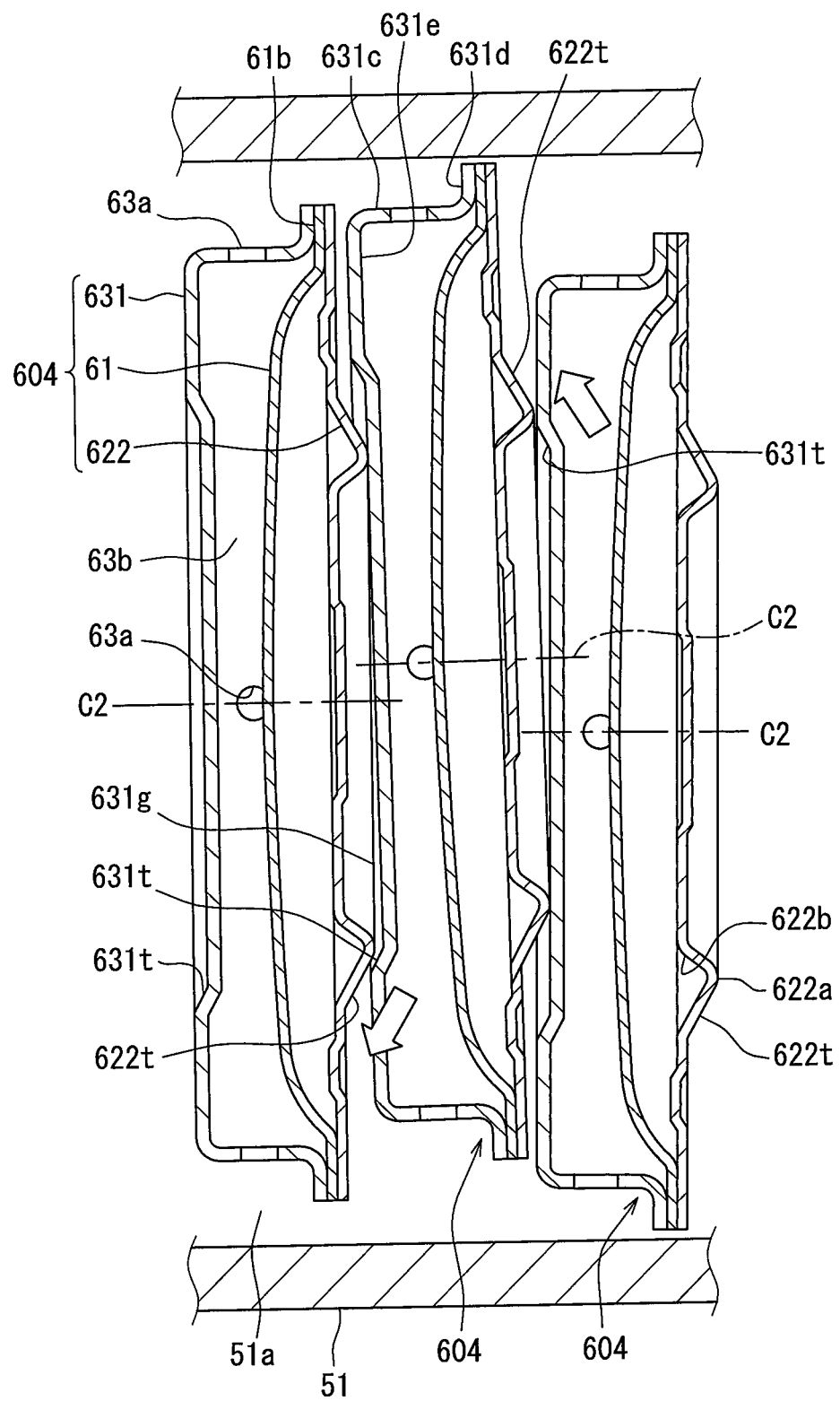
FIG. 6 is a sectional view illustrating damper units and a case according to a fifth embodiment.

Furthermore, in this embodiment, the contact side 631*t* of the regulation part 631*e* in contact with the enlarging protrusion part 622*a* has a taper shape inclined to the predetermined direction. Therefore, the workability can be improved as explained below, when the damper units 604 are arranged at the predetermined position within the case 51. That is, as shown in FIG. 6, when the damper unit 604 is forced in the predetermined direction (the left and right direction of FIG. 6) in the state where the central lines C2 of the damper units 604 are deviated from each other, as shown in the arrow directions in FIG. 6, the damper units 604 can be coaxially aligned. In other words, the contact sides 622*t* and 631*t* having the taper shape are forced onto each other, such that the damper unit 604 moves in the radial direction to make the central lines C2 to be aligned. Therefore, when disposing the damper units 604, the damper units 604 can be coaxially aligned using the enlarging protrusion part 622*a* of the plate 622, to improve the workability for the arrangement.

Sixth Embodiment

Figure 7:
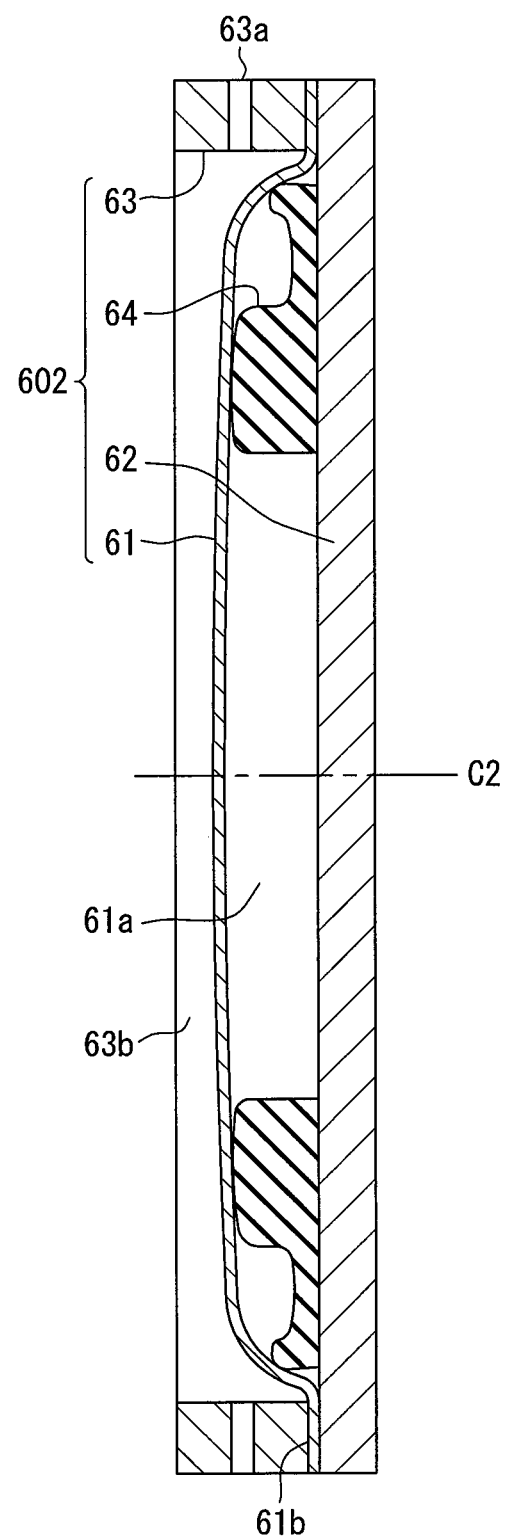
FIG. 7 is a sectional view illustrating a damper unit and an elastic support object according to a sixth embodiment.

The damper unit 602 of this embodiment has an elastic body 64, as shown in FIG. 7. The elastic body 64 is a product made of rubber or foam resin, and has a shape annularly extending around the central line C2 of the diaphragm 61. The damper unit 602 of this embodiment is the same as the damper unit 60 of the first embodiment in the structure, the form, and the size, except having the elastic body 64. The elastic body 64 is supported between the diaphragm 61 and the plate 62.

According to this embodiment, the elastic body 64 is disposed in the damper unit 60 shown in FIG. 2 to provide the damper unit 602 different in the attenuation performance. Therefore, the attenuation performance of the pulsation damper 50 can be adjusted without changing the size and form of the diaphragm 61 of the damper unit 60, 602.

Other Embodiment

It should be appreciated that the present disclosure is not limited to the embodiments described above and can be modified appropriately within the scope of the appended claims. The embodiments above are not irrelevant to one another and can be combined appropriately unless a combination is obviously impossible.

The pulsation damper 50 is applied to the fuel pump P in which the control valve 31 is arranged right above the piston 20. The pulsation damper 50 may be applied to a fuel pump in with the control valve 31 is arranged so that the axis of the control valve 31 crosses the axis C1 of the piston 20 (for example, perpendicularly). Alternatively, the pulsation damper 50 may be applied to a fuel pump in which the control valve 31 is arranged so that the axis of the control valve 31 is deviated from the axis C1 of the piston 20.

In each of the embodiments, the pulsation damper 50 is attached to the pump body 10 in a manner that the central line C2 of the diaphragm 61 (the predetermined direction in which the diaphragm 61 is elastically deformed) crosses the axis C1 of the piston 20 (for example, perpendicularly). Alternatively, the pulsation damper 50 may be attached to the pump body 10 in a manner that the predetermined direction in which the diaphragm 61 is elastically deformed becomes parallel to the axis C1 of the piston 20.

The pulsation damper is used in the fuel pump P which compressed and discharges fuel in each of the embodiments. The pulsation damper may be applied at a middle in a fuel piping extending from a fuel tank to the fuel pump P, or a fuel piping extending the fuel pump P to a fuel injection valve. The pulsation damper may be used in a common-rail or a delivery pipe to be explained below. The common-rail and the delivery pipe correspond to a pressure accumulating container which accumulates pressure of fuel breathed from the fuel pump P, and distributes the fuel to the fuel injection valve in each cylinder of the internal-combustion engine.

In each of the embodiments, the plural damper units are arranged in the fuel chamber 51a, however, only one damper unit may be arranged in the fuel chamber 51a. When the plural damper units are arranged, the form of the plate or the spacer may be different among the damper units, while the diaphragm 61 has the same form. For example, the volume enlarged by the enlarging protrusion part 620a may be made the same or different, and the volume reduced by the reduction protrusion part 621a may be made the same or different. The plates 62, 620, 621, and 622 may be used in the combination for one pulsation damper.

In each of the embodiments, the damper unit is arranged such that the diaphragm 61 is located between the plate and the second low-pressure passage L2. Alternatively, the damper unit may be arranged such that the plate is located between the diaphragm 61 and the second low-pressure passage L2.

In each of the embodiments, the spacer is fixed to the diaphragm 61 or the plate, to be formed integrally with the damper unit. Alternatively, the spacer may be produced separately from the damper unit. In this case, the damper unit and the spacer are separately inserted into the fuel chamber 51a.

Such changes and modifications are to be understood as being within the scope of the present disclosure as defined by the appended claims.

What is claimed is:

1. A pulsation damper comprising:
a case in which a fuel chamber is defined; and
a first damper unit and a second damper unit arranged in the fuel chamber to attenuate pressure pulsation of fuel, the first damper unit and the second damper unit facing each other along a specified direction and separated from each other along the specified direction by way of a spacer, wherein
the first damper unit has: a first diaphragm that is elastically deformable in response to changes in pressure of the fuel; a first plate coupled with the first diaphragm and having a rigidity higher than that of the first diaphragm; and a first gas chamber defined between the first diaphragm and the first plate,
the second damper unit has: a second diaphragm that is elastically deformable in response to changes in pressure of the fuel; a second plate coupled with the second diaphragm and having a rigidity higher than that of the second diaphragm; and a second gas chamber defined between the second diaphragm and the second plate,
the spacer has a first surface coupled to the first diaphragm of the first damper unit and a second surface abutting on the second plate of the second damper unit,
the second plate has a protrusion part that protrudes toward the first damper unit along the specified direction to enlarge the second gas chamber, and
the spacer has a regulation part that is in contact with the protrusion part and that restricts the second damper unit from moving in a direction perpendicular to the specified direction.

2. The pulsation damper according to claim 1, wherein
the regulation part of the spacer has a contact surface that is in contact with the protrusion part of the second plate, and
the contact surface of the spacer is inclined to the specified direction.

3. The pulsation damper according to claim 1, wherein
the protrusion part of the second plate has an annular shape surrounding a center of the second plate.

4. The pulsation damper according to claim 1, wherein
the spacer is integrally fixed with the first diaphragm and defines a distance between the first diaphragm of the first damper unit and the second plate of the second damper unit.

5. The pulsation damper according to claim 1, wherein
the first damper unit has the spacer and restricts the movement of the second damper unit along the direction perpendicular to the specified direction.

6. The pulsation damper according to claim 1, wherein
the second plate has a recessed part that is recessed away from the first damper unit along the specified direction to reduce the second gas chamber.

7. The pulsation damper according to claim 1, wherein
the first damper unit has the spacer,
the first damper unit is assembled in a manner that the spacer, the first diaphragm and the first plate are coupled with each other by welding, and
the second damper unit is assembled in a manner that the second diaphragm and the second plate are coupled with each other by welding.

8. The pulsation damper according to claim 7, wherein
the first diaphragm is located between the spacer and the first plate in the specified direction.

9. A fuel pump device comprising:
a fuel pump that compresses and discharges fuel flowing in a fuel passage defined in a pump body; and
a pulsation damper that reduces pressure pulsation of the fuel in the fuel passage, wherein
the pulsation damper includes:
a case in which a fuel chamber is defined; and
a first damper unit and a second damper unit arranged in the fuel chamber to attenuate pressure pulsation of fuel, the first damper unit and the second damper unit facing each other along a specified direction and separated from each other along the specified direction by way of a spacer, and
the first damper unit has: a first diaphragm that is elastically deformable in response to pressure of the fuel; a first plate coupled with the first diaphragm and having a rigidity higher than that of the first diaphragm; and a first gas chamber defined between the first diaphragm and the first plate, the second damper unit has: a second diaphragm that is elastically deformable in response to changes in pressure of the fuel; a second plate coupled with the second diaphragm and having a rigidity higher than that of the second diaphragm; and a second gas chamber defined between the second diaphragm and the second plate, the spacer has a first surface coupled to the first diaphragm of the first damper unit and a second surface abutting on the second plate of the second damper unit the second plate has a protrusion part that protrudes toward the first damper unit along the specified direction to enlarge the second gas chamber, and the spacer has a regulation part that is in contact with the protrusion part and that restricts the second damper unit from moving in a direction perpendicular to the specified direction.

10. The fuel pump device according to claim 9, wherein the first damper unit has the spacer, the first damper unit is assembled in a manner that the spacer, the first diaphragm and the first plate are coupled with each other by welding, and the second damper unit is assembled in a manner that the second diaphragm and the second plate are coupled with each other by welding.

11. The fuel pump device according to claim 10, wherein the first diaphragm is located between the spacer and the first plate in the specified direction.

* * * * *